UNITED STATES PATENT OFFICE.

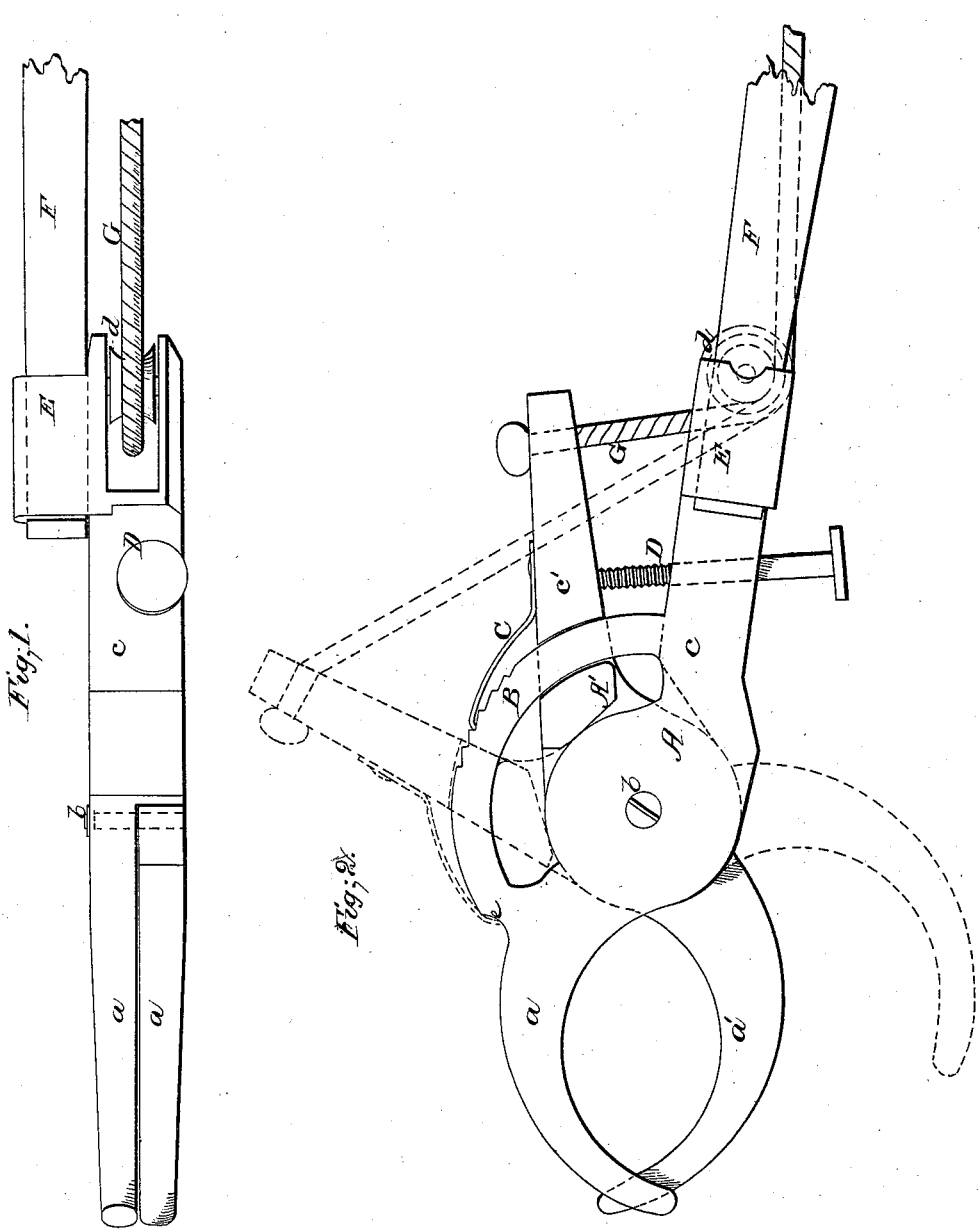

LOUIS GOLDSMITH AND NOAH GREGORY, JR., OF GOSHEN, NEW YORK.

IMPLEMENT FOR CATCHING SWINE.

Specification forming part of Letters Patent No. 40,476, dated November 3, 1863.

*To all whom it may concern:*

Be it known that we, LOUIS GOLDSMITH and NOAH GREGORY, Jr., of Goshen, in the county of Orange and State of New York, have invented a new and useful implement or device for catching or grappling swine for the purpose of leading, dragging, or securing them at any spot; and we do hereby declare that the following is a full, clear, and exact description of the same, reference being had to the accompanying drawings, making a part of this specification, in which—

Figure 1 is an edge view of our invention; Fig. 2, a side view of the same.

Similar letters of reference indicate corresponding parts in the two figures.

The object of this invention is to obtain a simple and efficient device for catching and holding swine for the purpose of dragging or leading them about.

The invention consists in the employment or use of two jaws, which cross each other, and are connected by a pivot, and used in connection with a rack and pawl, a gage or set-screw, and a rope, all arranged in such a manner as to operate perfectly for the purpose specified.

To enable those skilled in the art to fully understand and construct our invention, we will proceed to describe it.

A A' represent two jaws, which are of hook form at one end, as shown at $a$ $a'$, and which cross each other, and are connected by a pivot, $b$, as shown clearly in Fig. 2. One of these jaws, A, has a segment-rack, B, attached to it, said rack extending from the shank $c$ of the jaw to the back part of its hook $a$, as shown in Fig. 2, and the shank $c'$ of the jaw A' has a pawl, C, attached to it which catches into the rack B, and prevents the hooks $a$ $a'$ from being distended or forced apart, the teeth of the rack B being of ratchet shape to admit of the pawl slipping over them when the jaws close by drawing their shanks $c$ $c'$ toward each other.

D is a gage or set screw, which passes through the shank $c$ of the jaw A, and limits the distance of the closing movement of the shanks $c$ $c'$. At the end of the shank $c$ there is a pulley, $d$, and also a socket, E, the latter to receive a pole or handle, F.

To the end of the shank $c'$ there is attached a rope, G, and this rope passes around the pulley $d$. At the front end of the rack B, where it joins the hook $a$, there is a depression, $e$, into which the end of the pawl C catches when the shanks $c$ $c'$ are distended, as shown in red in Fig. 2, the pawl C being thus made to hold the hooks $a$ $a'$ in an open state and prevent them from casually closing.

The implement or device is used as follows: The shanks $c$ $c'$ are distended and the hooks $a$ $a'$ kept apart by the pawl C, catching into the depression $e$, and by the aid of the pole or handle F the hooks $a$ $a'$ are placed on a leg of the animal. The rope G is then pulled, and the shanks $c$ $c'$ are drawn toward each other, the hooks $a$ $a'$ consequently closing and grasping the leg. The animal thus secured may be led or dragged by the rope G or secured at any desired spot. The set-screw D limits the extent of the closing movement of the hooks $a$ $a'$, so that they may be properly adapted or adjusted to the leg. To open the hooks $a$ $a'$ and release the animal, the pawl C is simply pulled out from or disengaged from the rack B, and the shanks $c$ $c'$ disturbed or forced apart.

The device may be constructed of wood or metal. The latter material would probably be preferable.

Having thus described our invention, what we claim as new, and desire to secure by Letters Patent, is—

The two jaws A A', formed of the hooks $a$ $a'$ and shanks $c$ $c'$, connected by the pivot $b$, in connection with the rack B, pawl C, and rope G, and with or without the pole F, and gage or set-screw D, all arranged substantially as and for the purpose herein set forth.

LOUIS GOLDSMITH.
NOAH GREGORY, JR.

Witnesses:
ADAM G. CRANS,
G. H. CRANS.